United States Patent [19]

Itoh

[11] Patent Number: 4,515,253

[45] Date of Patent: May 7, 1985

[54] DAMPING FORCE GENERATING DEVICE FOR AN OIL DAMPER

[75] Inventor: Hidekuni Itoh, Shizuoka, Japan

[73] Assignee: Kabushiki Kaisha Showa Seisakusho, Tokyo, Japan

[21] Appl. No.: 482,876

[22] Filed: Apr. 7, 1983

[30] Foreign Application Priority Data

Apr. 16, 1982 [JP] Japan ................................ 57-63627

[51] Int. Cl.³ .............................................. F16F 9/44
[52] U.S. Cl. ..................................... 188/314; 188/285
[58] Field of Search ............... 188/288, 285, 297, 299, 188/314, 322.14; 267/64.15

[56] References Cited

U.S. PATENT DOCUMENTS

| | | | |
|---|---|---|---|
| 2,291,499 | 7/1942 | Penick | 188/314 X |
| 2,804,513 | 8/1957 | Oppel | 188/314 X |
| 3,706,362 | 12/1972 | Faure | 188/322.14 X |
| 4,061,320 | 12/1977 | Warner | 188/314 X |
| 4,311,302 | 1/1982 | Heyer et al. | 188/314 X |

FOREIGN PATENT DOCUMENTS

120375  9/1979  Japan ................................. 188/314

*Primary Examiner*—Duane A. Reger
*Attorney, Agent, or Firm*—Irving M. Weiner; Pamela S. Burt

[57] ABSTRACT

A damping force generating device for an oil damper including a hydraulic cylinder, a sub-tank having in the interior thereof an oil chamber and a gas chamber, and a first oil passage which hydraulically connects the hydraulic cylinder to the oil chamber. The damping force generating device comprises a valve seat having second and third oil passages for passing therethrough an operating oil when it is flowing in first and second directions of the first oil passage, respectively; a first valve for opening and closing the second oil passage; and a second valve for opening and closing the third oil passage. The first or second valve comprises a valve body, a mechanism for normally urging the valve body in a closing direction, and an urging force adjusting arrangement for adjusting the urging force of the urging mechanism from the exterior. The damping force generating device is simplified in structure and provides for a reduction in size of the oil damper as well as facilitated adjustment of the damping force.

7 Claims, 5 Drawing Figures

DAMPING FORCE GENERATING DEVICE FOR AN OIL DAMPER

BACKGROUND OF THE INVENTION

1. Field of the Invention

The present invention relates generally to a damping force generating device for an oil damper used as a rear cushion in two-wheeled motor vehicles or the like. More particularly, the invention relates to a damping force generating device for an oil damper provided with a sub-tank having a gas chamber which is separate from a cylinder in which a piston is slidably inserted.

2. Description of Relevant Art

There has been known an oil damper of the type having a single cylinder provided with a sub-tank in which a volumetric change in the interior of the cylinder caused by a sliding motion of a piston therein, i.e., a volumetric change therein corresponding to an intruding or retreating volume of a piston rod, is compensated by a volumetric change of gas in the sub-tank, by hydraulically connecting the cylinder with the sub-tank.

Recently, in two-wheeled motor vehicles or the like, there has been a tendency to adopt a single rear cushion and mount it under a seat positioned centrally of the vehicle body, or thereabout. However, if the foregoing oil damper provided with a sub-tank is used for a rear cushion of this type, the structure of the damper, particularly the sub-tank, becomes complicated and large in size, and it is difficult to selectively change the damping characteristic of the damper. Thus, use of such an oil damper has not always been desirable from the standpoint of maintenance.

The present invention effectively overcomes the foregoing problems attendant the conventional oil damper.

SUMMARY OF THE INVENTION

The present invention provides a damping force generating device for an oil damper including a hydraulic cylinder, a sub-tank provided in the interior thereof with an oil chamber and a gas chamber, and a first oil passage which hydraulically connects the hydraulic cylinder to the oil chamber in the sub-tank. The damping force generating device comprises a valve seat disposed in the first oil passage and having at least one second oil passage for passing therethrough an operating oil when it is flowing in a first direction from the hydraulic cylinder toward the oil chamber in the sub-tank, and at least one third oil passage for passing therethrough the operating oil when it is flowing in a second direction from the oil chamber in the sub-tank toward the hydraulic cylinder. A first valve means is provided for opening the second oil passage when the operating oil flows in the first direction and closing it when the operating oil flows in the second direction, and a second valve means is provided for closing the third oil passage when the operating oil flows in the first direction and opening it when the operating oil flows in the second direction. The first or second valve means comprises a valve body, means for normally urging the valve body in the closing direction, and urging force adjusting means for adjusting from the exterior the urging force of the urging means.

It is an object of the present invention to provide a damping force generating device capable of contributing to the simplification of structure and reduction in size of an oil damper.

It is another object of the present invention to provide a damping force generating device for an oil damper capable of adjusting the damping force easily and thus affording favorable maintenance characteristics.

The above and further objects, details and advantages of the present invention will become apparent from the following detailed description of preferred embodiments thereof, when read in conjunction with the accompanying drawings.

DETAILED DESCRIPTION OF PREFERRED EMBODIMENTS

Figure 1:
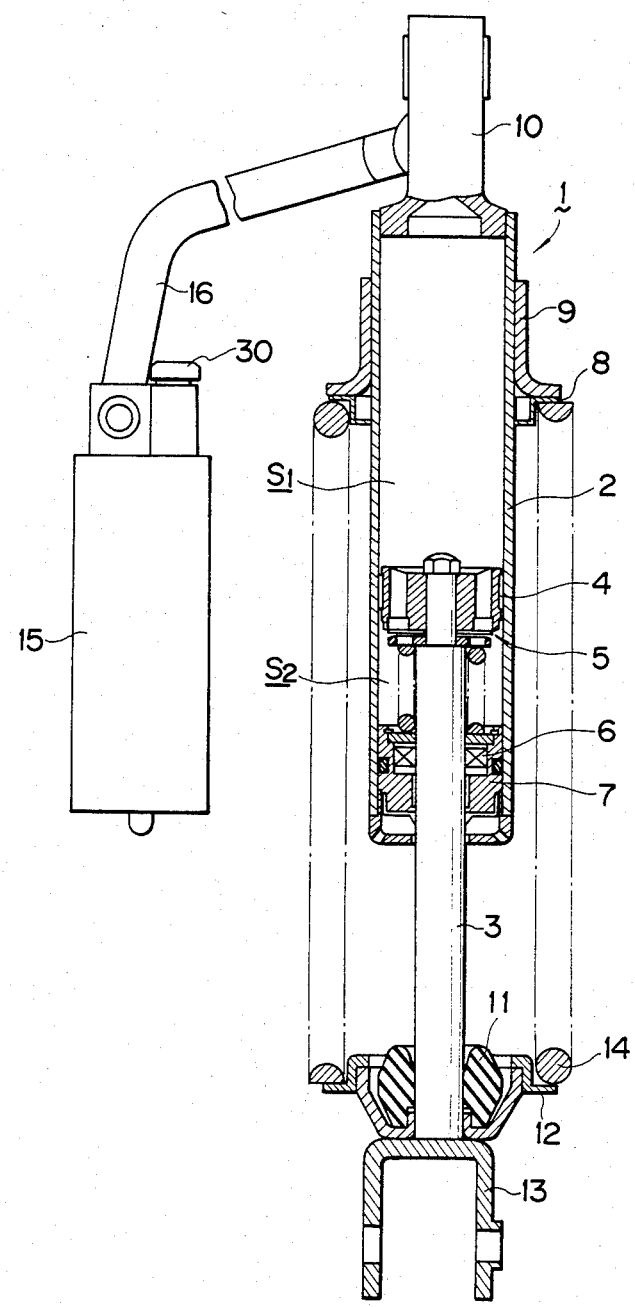
FIG. 1 is a longitudinal sectional view of an oil damper provided with a sub-tank in which is disposed a damping force generating device according to a preferred embodiment of the present invention.

With reference to FIG. 1, a piston rod 3 is inserted from below into a cylinder 2 of an oil damper 1, and a piston 4 which is slidable within the cylinder 2 is fixed to the upper end of the piston rod 3. A valve mechanism 5 which is a known damping force generating mechanism is attached to the piston 4.

In the interior of the lower portion of the cylinder 2 are fitted an oil seal 6 and a rod guide 7 which are in sliding contact with the outer periphery of the piston rod 3. On the outer periphery of the cylinder 2 are fitted an upper spring shoe 8 and a spring adjuster 9, with an upper mounting member 10 being fixed to the upper end of the cylinder 2.

The interior of the cylinder 2 is partitioned by the piston 4 into an upper operating chamber $S_1$ and a lower operating chamber $S_2$, both chambers $S_1$ and $S_2$ being filled with an operating oil.

To the lower end of the piston rod 3 is fixed a lower spring shoe 12, with a cushion spring 14 being stretched between the lower spring shoe 12 and the upper spring shoe 8 as shown in FIG. 1.

The upper end of the cylinder 2 is connected, for example, to the vehicle body side through the upper mounting member 10, while the lower end of the rod 3 is connected to the vehicle wheel side through the lower mounting member 13, with the cylinder 2 and the piston rod 3 being adapted to expand and contract relative to each other.

The structure of the piston 4 and that of the valve mechanism 5 are known, and thus detailed description thereof is omitted.

Figure 2:
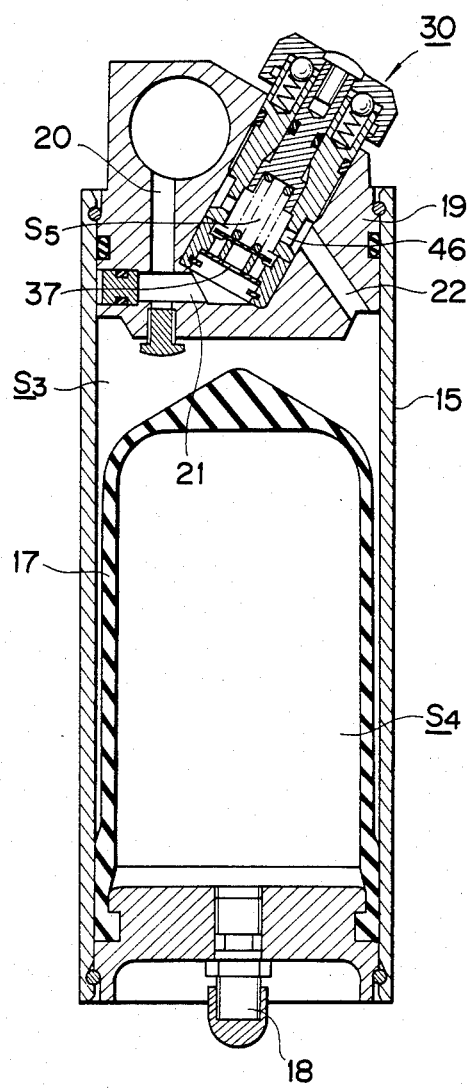
FIG. 2 is a longitudinal sectional view of the sub-tank provided with the damping force generating device according to the preferred embodiment of the present invention.

Outside the cylinder 2 is separately provided a sub-tank 15 as shown in detail in FIG. 2, the sub-tank 15 and the cylinder 2 being interconnected through a pipe 16.

As shown in FIG. 2, the interior of the sub-tank 15 is partitioned by a flexible partition member (bladder) 17 into an oil chamber $S_3$ and a gas chamber $S_4$, with air at a predetermined pressure being sealed in the gas chamber $S_4$ through an air valve 18.

In an end plate 19 of the sub-tank 15 are formed oil passages 20, 21 and 22 which provide communication between the oil chamber $S_3$ in the sub-tank and the upper operating chamber $S_1$ of the cylinder 2, with a damping force generating device 30 according to the present invention being fixedly mounted in an intermediate position relative to the oil passages 20–22.

Construction of the damping force generating device 30 will now be described with reference to FIG. 3, wherein reference numeral 31 denotes a valve seat, with a valve seat cap 32 being threadedly engaged with the end plate 19 through threads 32a in a position above the valve seat 31.

A hole 33 is formed centrally of a partition wall 31a of the valve seat 31, and outside the hole 33 are radially formed a plurality of holes 34. Further, on the upper surface of the partition wall 31a is mounted a first check valve 36 having a plurality of holes 35 corresponding to the holes 34, while on the lower surface of the partition wall 31a is mounted a second check valve 38 having a centrally located hole 37 corresponding to the hole 33. The check valve 38 is urged upwardly, i.e., in a closing direction, by means of a valve spring 40 which is mounted in a compressed state between the check valve 38 and a stopper ring 39.

In the interior of the valve seat cap 32 a rod 41 is threadedly engaged with the cap 32 through threads 41a formed on the lower portion of the rod 41, and thus the rod 41 is rotatable with respect to the valve seat cap 32. To the upper end of the rod 41 is fixed an adjusting dial 42 by a machine screw 43. In substantially hemispherical grooves 42a formed in the back of the adjusting dial 42 are engaged balls 45 which are resiliently held by springs 44. By the engagement of the balls 45, a click is imparted to the rotation of the adjusting dial 42, and at the same time the loosening of the dial 42 is prevented and thus the loosening of the rod 41 is prevented.

Further, an oil chamber $S_5$ is formed in the interior of the lower portion of the valve seat cap 32, and a plurality of holes 46 are formed in the cap 32 around the oil chamber $S_5$, so that the oil chamber $S_5$ communicates with the oil chamber $S_3$ in the sub-tank 15 through the holes 46 and oil passage 22.

Moreover, within the oil chamber $S_5$ is disposed a coil spring 47 in a compressed state between the rod 41 and the first check valve 36 mounted on the upper surface of the partition wall 31a of the valve seat 31. By the spring 47 the first check valve 36 is normally urged downwardly, i.e., in a closing direction.

Figure 3:
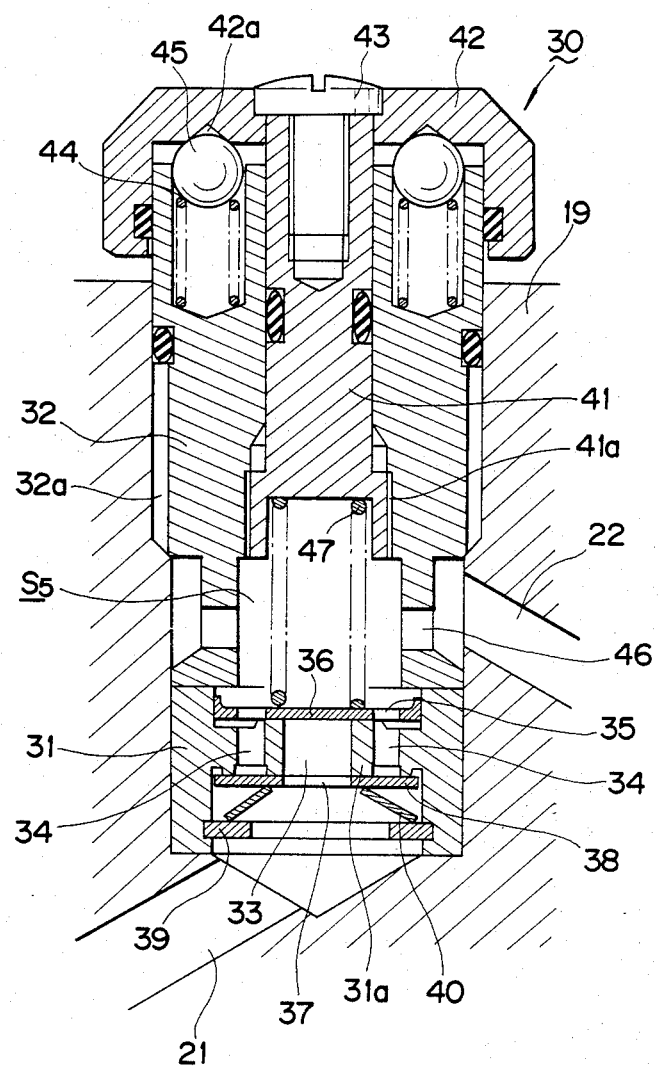
FIG. 3 is a longitudinal sectional side view of the damping force generating device shown in FIG. 2.

In FIG. 3, the rod 41 is positioned so as to be most remote from the first check valve 36 and therefore the urging force of the spring 47 is at a minimum value.

The operation of the oil damper 1 will now be described hereinbelow.

A compression stroke of the piston 4 will be explained with reference to FIGS. 1 through 4. In FIG. 1, as the piston 4 moves up relative to the cylinder 2, the oil in the upper operating chamber $S_1$ of the cylinder 2 flows through the valve mechanism 5 into the lower operating chamber $S_2$ and a damping force is generated within the cylinder 2 by the flow resistance of the oil passing the valve mechanism 5.

Figure 4:
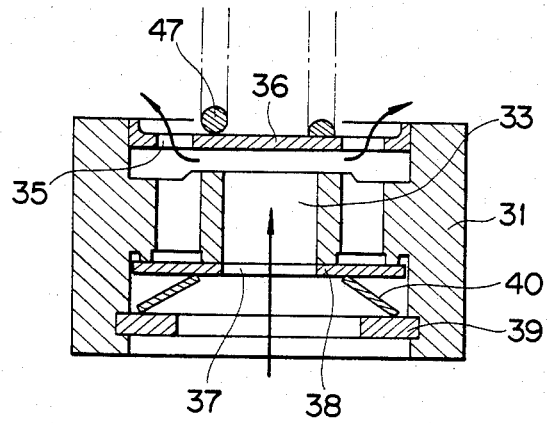
FIGS. 4 and 5 are partially cut-away side views for explaining the operation of the damping force generating device shown in FIG. 3.

The operating oil, in an amount corresponding to the intruding volume of the piston rod 3 into the cylinder 2, is introduced through the pipe 16 into the oil chamber $S_3$ in sub-tank 15. The oil thus introduced through the pipe 16 then flows through the oil passages 20 and 21 and further passes through the hole 37 of the second check valve 38 and the central hole 33 of the valve seat 31, as shown in FIG. 4, and forces open the first check valve 36 upwardly against the spring 47 by virtue of its pressure. Then the oil flows through the plurality of holes 35 of the first check valve 36, oil chamber $S_5$, the plurality of holes 46 and finally through the oil passage 22 into the oil chamber $S_3$ in the sub-tank and compresses the air in the gas chamber $S_4$.

A damping force is generated within the damping force generating device 30 by the flow resistance induced when the operating oil passes through the check valves 36 and 38, and this damping force can be selectively adjusted by turning the adjusting dial 42 in either a clockwise or counterclockwise direction to move the rod 41 up or down relative to the cap 32, thereby changing the set length of the valve spring 47 and thus changing the urging force of the spring 47.

An expansion stroke of the piston 4 will now be explained with reference to FIGS. 1 through 3 and 5. In FIG. 1, when the piston 4 moves down relative to the cylinder 2, the oil in the lower operating chamber $S_2$ of the cylinder 2 flows through the valve mechanism 5 into the upper operating chamber $S_1$, and at this time a required damping force is generated within the cylinder 2.

Figure 5:
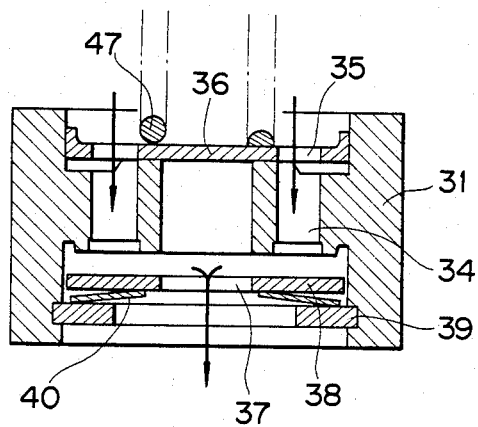

At this time, moreover, the operating oil corresponding to the retreating volume in the cylinder 2 caused by the downward movement of the piston rod 3 must be replenished from the oil chamber $S_3$ in the sub-tank 15 into the cylinder 2 through the pipe 16. That is, the oil in the sub-tank oil chamber $S_3$ flows through the oil passage 22, holes 46, oil chamber $S_5$, then, as shown in FIG. 5, passes through the plurality of holes 35 of the first check valve 36 and the plurality of holes 34 of the valve seat 31, and forces down the second check valve 38 against the valve spring 40 by virtue of its pressure. The oil then flows through the central hole 37 of the check valve 38, oil passages 21, 20 and pipe 16 and finally into the cylinder 2. Also in this case, a required damping force is generated within the device 30 by the flow resistance induced when the operating oil passes through the check valves 36 and 38. As a result of flow of the oil in the sub-tank oil chamber $S_3$ into the cylinder 2, the air in the gas chamber $S_4$ expands.

Thus, the damping force generating device 30 generates a damping force in both compression and expansion strokes, and this damping force (in this embodiment the damping force in the compression stroke) can be selectively adjusted by a simple operation from the exterior, which is convenient for maintenance of the damper.

Moreover, the damping force generating device 30 of the present invention, by merely attaching it to sub-tank 15, can provide a damping force between the cylinder side oil chamber $S_1$ and the oil chamber $S_3$ in the sub-tank 15. Therefore, by only a simple modification of the structure of a conventional sub-tank, it becomes possible to put the device 30 to practical use, and the device 30 itself can be simplified in its structure and reduced in its size, thus permitting even reduction in size of the sub-tank.

In the above-described embodiment, as shown in FIG. 3, the first valve 36 is normally urged in the closing direction by means of the coil spring 47 to adjust the damping force in the compression stroke of the piston, i.e., to adjust the flow path resistance of the valve 36, and such urging force is adjusted by the rod 41 and the adjusting dial 42.

However, a coil spring can be readily adopted as the spring 40 of the second valve 38, with its urging force being made adjustable by virtue of the same construction as in the foregoing embodiment, whereby the damping force in the expansion stroke of the piston can be adjusted.

Furthermore, it will be understood that the spring in question is not limited to a coil spring and that any other suitable spring may alternatively be employed.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. A damping force generating device for an oil damper including a hydraulic cylinder, a sub-tank having in the interior thereof an oil chamber and a gas chamber, and a first oil passage which hydraulically connects said hydraulic cylinder to said oil chamber in said sub-tank, comprising:

a valve seat disposed in an end plate of said sub-tank forming part of said first oil passage, said valve seat having at least one second oil passage for passing therethrough an operating oil when it is flowing in a first direction from said hydraulic cylinder toward said oil chamber in said sub-tank and at least one third oil passage for passing therethrough said operating oil when it is flowing in a second direction from said oil chamber in said sub-tank toward said hydraulic cylinder;

first valve means for opening said second oil passage when said operating oil flows in said first direction and closing said second oil passage when said operating oil flows in said second direction;

second valve means for closing said third oil passage when said operating oil flows in said first direction and opening said third oil passage when said operating oil flows in said second direction; and said first and second valve means each being disposed in said end plate of said sub-tank.

2. A damping force generating device according to claim 1, wherein:

said first valve means comprises a first valve body disposed on the sub-tank oil chamber side of said valve seat and first urging means for normally urging said first valve body in a closing direction.

3. A damping force generating device according to claim 1, wherein:

said second valve means comprises a second valve body disposed on the hydraulic cylinder side of said valve seat and second urging means for normally urging said second valve body in a closing direction.

4. A damping force generating device according to claim 1, wherein:

said first valve means comprises a first valve body disposed on the sub-tank oil chamber side of said valve seat and first urging means for normally urging said first valve body in a closing direction; and said second valve means comprises a second valve body disposed on the hydraulic cylinder side of said valve seat and second urging means for normally urging said second valve body in a closing direction.

5. A damping force generating device according to claim 2, wherein:

said first urging means comprises a spring which normally urges said first valve body in said closing direction and first urging force adjusting means for adjusting the urging force of said spring.

6. A damping force generating device according to claim 4, wherein:

said first urging means comprises a spring which normally urges said first valve body in said closing direction and first urging force adjusting means for adjusting the urging force of said spring.

7. A damping force generating device according to claim 5, wherein:

said first urging force adjusting means comprises first rod means which is in abutment with said spring at one end thereof and exposed to the exterior at the other end thereof, and holding means for holding an adjusted position of said first rod means.

* * * * *